(12) United States Patent
Wolter

(10) Patent No.: US 7,494,142 B2
(45) Date of Patent: Feb. 24, 2009

(54) SWING ARM WITH IMPACT DAMPENER

(75) Inventor: Karl Wolter, St. Albert (CA)

(73) Assignee: Lehman Trikes U.S.A., Inc., Spearfish, SD (US)

( * ) Notice: Subject to any disclaimer, the term of this patent is extended or adjusted under 35 U.S.C. 154(b) by 454 days.

(21) Appl. No.: 11/173,934

(22) Filed: Jul. 1, 2005

(65) Prior Publication Data
US 2007/0001418 A1    Jan. 4, 2007

(51) Int. Cl.
B60G 9/02    (2006.01)
(52) U.S. Cl. .................. 280/124.116; 280/124.156
(58) Field of Classification Search .................. 180/210, 180/215, 216, 227, 231; 280/124.116, 124.128, 280/124.13, 124.156, 124.169, 124.177, 280/124.178, 288
See application file for complete search history.

(56) References Cited

U.S. PATENT DOCUMENTS

| 702,992 | A | 6/1902 | Pecor |
| 4,287,960 | A | 9/1981 | McConnell |
| 4,325,449 | A * | 4/1982 | D'Addio et al. ............. 180/217 |
| 4,449,602 | A | 5/1984 | Dittmann, Jr. |
| 4,530,514 | A | 7/1985 | Ito |
| 4,540,062 | A * | 9/1985 | Kashiwai ..................... 180/227 |
| 4,583,612 | A | 4/1986 | Parker |
| 4,813,697 | A | 3/1989 | Takada |
| 4,815,755 | A | 3/1989 | Takata et al. |
| 4,877,102 | A | 10/1989 | Stewart |
| 4,957,308 | A | 9/1990 | Takizawa |
| 5,487,443 | A | 1/1996 | Thurm |
| 5,529,141 | A | 6/1996 | Lehman et al. |
| 5,692,577 | A | 12/1997 | Dornbusch et al. |
| 5,785,141 | A | 7/1998 | Breitkreutz et al. |
| 5,884,717 | A | 3/1999 | Lehman et al. |
| 6,581,716 | B1 | 6/2003 | Matsuura |
| 6,588,778 | B1 * | 7/2003 | McLaughlin ........... 280/124.13 |
| 6,640,922 | B2 | 11/2003 | Nakagawa |
| 7,287,772 | B2 * | 10/2007 | James ........................ 280/288 |
| 2006/0017256 | A1 * | 1/2006 | Hupperich, Jr. ...... 280/124.156 |
| 2006/0290097 | A1 * | 12/2006 | Kawamura et al. .......... 280/288 |

FOREIGN PATENT DOCUMENTS

JP    61-169305    *    7/1986

* cited by examiner

Primary Examiner—John Q. Nguyen
Assistant Examiner—Joseph Rocca
(74) Attorney, Agent, or Firm—David & Bujold, P.L.L.C.

(57) ABSTRACT

A swing arm with impact dampener, includes a swing arm having a pivoting coupling end and a non-pivoting coupling end. An impact dampening assembly is positioned at the non-pivoting coupling end.

28 Claims, 3 Drawing Sheets

SWING ARM WITH IMPACT DAMPENER

FIELD OF THE INVENTION

The present invention relates to a swing arm for a motorized tricycle that has a built in dampener to absorb impacts.

BACKGROUND OF THE INVENTION

When driving over a rough road surface, the impact that the wheel experiences is transmitted through the axle, into the swing arm, into the motorcycle frame to the rider.

SUMMARY OF THE INVENTION

According to the present invention there is provided a swing arm with impact dampener, which includes a swing arm having a pivoting coupling end and a non-pivoting coupling end. An impact dampening assembly is positioned at the non-pivoting coupling end.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
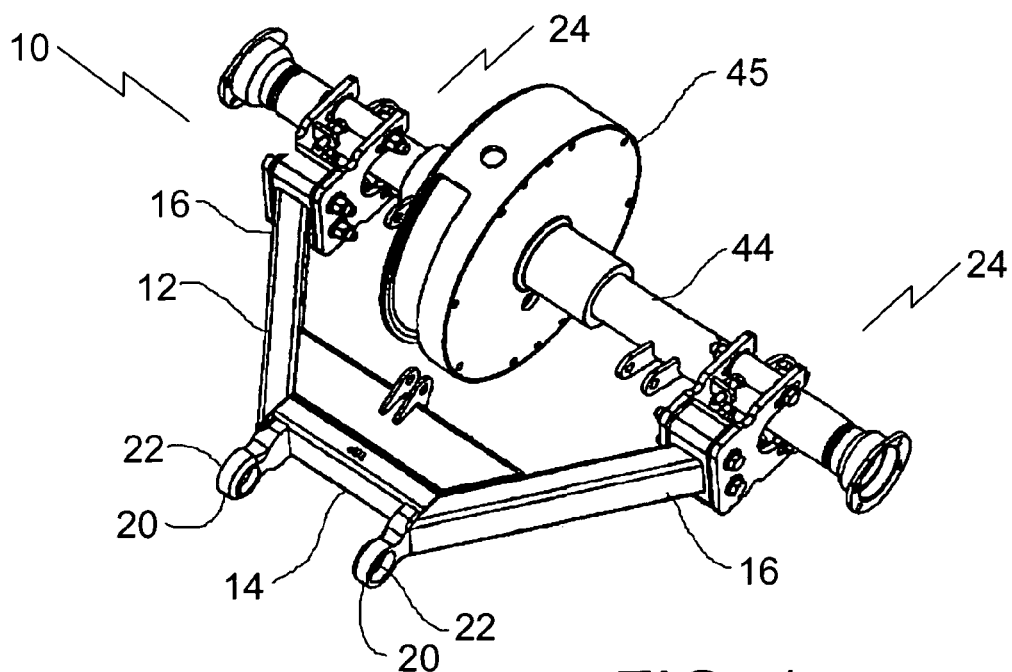
FIG. 1 is a perspective view of a swing arm with dampener constructed in accordance with the teachings of the present invention.

The preferred embodiment, a swing arm generally identified by reference numeral 10, will now be described with reference to FIG. 1 through 4.

Figure 2:
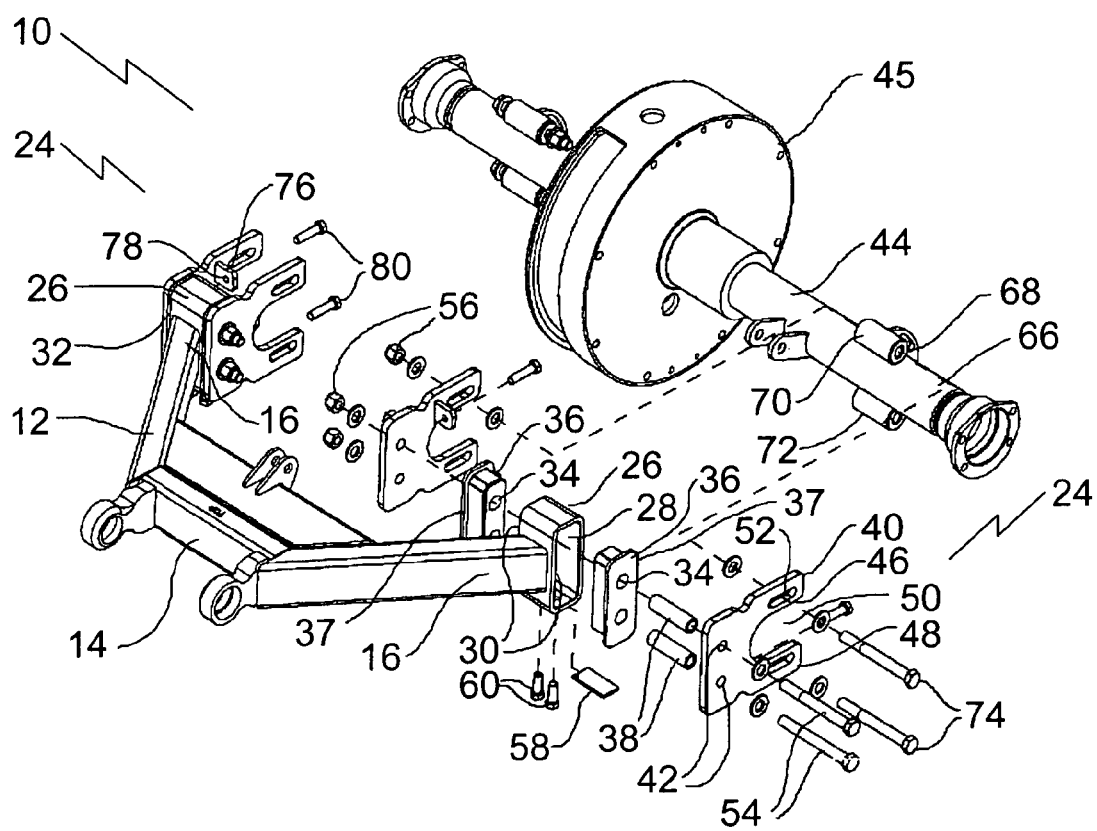
FIG. 2 is an exploded perspective view of the swing arm with dampener illustrated in FIG. 1.
Figure 3:
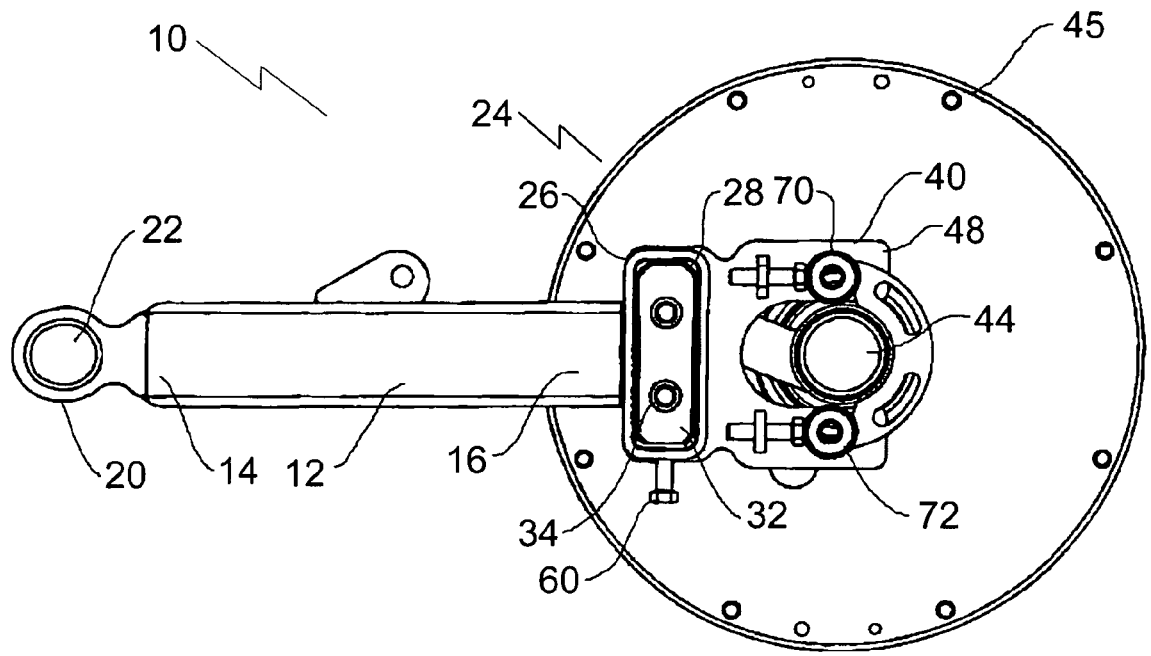
FIG. 3 is a side elevation view, in section, of the swing arm with dampener illustrated in FIG. 1.
Figure 4:
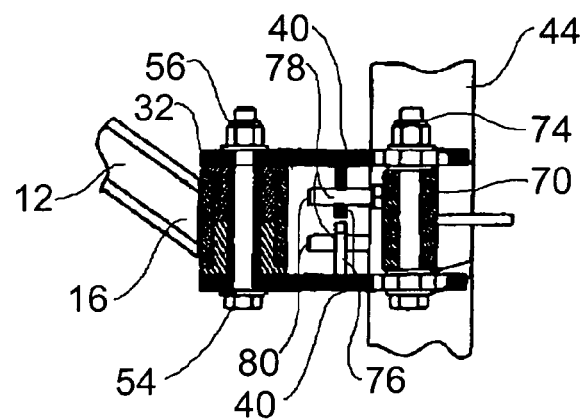
FIG. 4 is a detailed top plan view, in section, of the swing arm with dampener illustrated in FIG. 1.

Structure and Relationship of Parts:

Referring to FIG. 1, swing arm 10 includes a forked swing arm 12 having a pivoting coupling end 14 and two spaced apart non-pivoting coupling ends 16. Pivoting coupling end 14 has a pair of spaced shaft retainers 20 that define axially aligned circular openings 22. There is an impact dampening assembly positioned at each non-pivoting coupling end 16, indicated generally by reference number 24. Referring to FIG. 2, impact dampening assembly 24 includes a tubular bushing housing 26, which has a rectangular cross-section, positioned transversely across non-pivoting coupling end 16 of swing arm 10. Housing 26 defines a bushing receiving cavity 28 with two open opposed ends 30. There is also a rectangular compliant bushing 32 disposed in bushing receiving cavity 28 that protrudes past each of opposed ends 30. Bushing 32 has apertures 34 extending therethrough, and consists of two halves 36. Each half 36 of bushing 32 is inserted into bushing receiving cavity 28 of housing 26 from one of the opposed ends 30, and has a flange 37 that limits depth of insertion into bushing receiving cavity 28. Metal wear sleeves 38 extend through apertures 34 in compliant bushing 32. Each opposed end 30 of housing 26 is covered by an attachment plate 40. Attachment plates 40 have openings 42 and are adapted to facilitate attachment of non-pivoting coupling end 16 of swing arm 10 to an axle 44. A differential 45 is disposed along axle 44 between dampening assemblies 24. A remote edge 46 of each attachment plate 40 is C-shaped with projecting arms 48 that define the border for a cavity 50. Each projecting arm has a slotted opening 52. There is also illustrated bolts 54 that extend through wear sleeves 38 in bushing 32 and openings 42 in attachment plates 40. Nuts 56 cooperate with bolts 54 to exert a clamping force of attachment plates 40 upon bushing 32 and metal wear sleeves 38, such that bushing 32 deforms in response to force exerted via attachment plates 40 prior to transferring impact forces via housing 26 to swing arm 10. A compression plate 58 is disposed within housing 26, and screws 60 extend through threaded apertures 62 in housing 26 to move compression plate 58 such that it exerts a compression force upon bushing 32. Swing arm 10 is shown combined with an axle 44 having a cylindrical exterior surface 66 with a pair of spaced apart swing arm mountings 68 on exterior surface 66. Referring to FIG. 3, each swing arm mounting 68 has an upper fastener receiver 70 and a lower fastener receiver 72. Referring again to FIG. 2, axle 44 is secured to attachment plates 40 by fasteners 74 that extend through slotted openings 52 in projecting arms 48 of attachment plates 40 and upper fastener receiver 70, and slotted openings 52 and lower fastener receiver 72. Referring to FIG. 4, attachment plates 40 have inwardly projecting ears 76 with threaded apertures 78 in which are received alignment screws 80. Alignment screws 80 are used to exert a force to assist in aligning swing arm 10 relative to axle 44 by moving fasteners 74 that extend through upper fastener receiver 70 and lower fastener receiver 72 along slotted openings 52 in projecting arms 48 of attachment plates 40. When differential 45 is belt driven, alignment screws 80 can also be used to tighten the belt (not shown) by moving fasteners 75 along slotted openings 52.

Operation:

The use and operation of swing arm 10 will now be discussed with reference to FIGS. 1 through 4. Referring to FIG. 2 swing arm 10 is assembled as described above. Referring to FIG. 1, axle 44 is connected to the rear tires of a trike (not shown), and pivoting coupling end 20 is connected to the frame of the trike. Alignment is made during installation by adjusting alignment screws 80 in projecting ears 76. As the trike passes over a rough surface, the tires of the trike will either drop into a pothole or strike and climb an obstacle. This impact is transmitted from the tires, to the axle, and into impact dampening assembly 24. Referring to FIG. 2, due to the attachment of axle 44 to projecting arms 48 of attachment plate 40, the impact is transmitted to attachment plate 40. The impact is transmitted to bushing 32, which is attached to attachment plates 40 as described above. Bushing 32 acts to absorb some of the force of the impact prior to transmitting such impact to housing 26 and along swing arm 16. While the impact is not eliminated, the amount of the impact which is transmitted to the rider is diminished, so that the rider experiences a smoother ride. The amount of movement of bushing 32 can be adjusted by adjusting screws 60 to move compression plate 58, to increase or decrease the force upon bushing 32.

Figure 5:
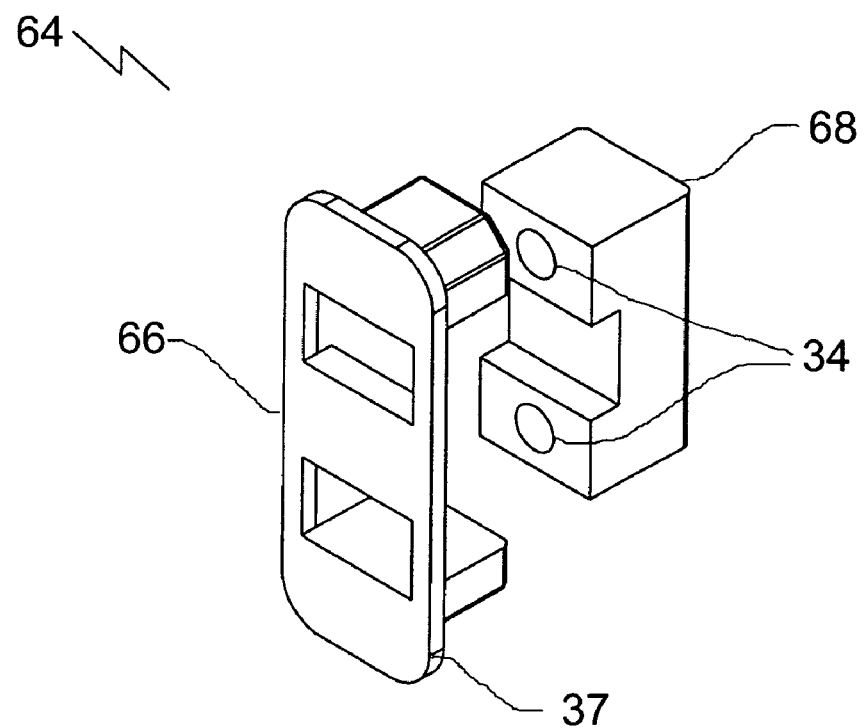
FIG. 5 is an exploded perspective view of one half of an alternative bushing.

Variation:

When differential 45 is belt driven, it was noticed that problems were occurring during rapid braking and acceleration as a result of too much twisting of rubber bushing 32, resulting in problems with belt tension and alignment. To counter this, another type of bushing may be used that is made of at least two materials with different compliant properties, such as a central core made from a material that is stiffer and less compliant as compared to the material of the outer portion. Referring to FIG. 5, one half of bushing 32 is shown, indicated generally by reference numeral 64. Half 64 has a flexible outer portion 66 with a central core 68. Core 68 limits twisting, while outer portion 66 allows the desired up and down movement, and some twisting. Core 68 interlocks with outer portion 66. Core 68 has apertures 34, such that, when installed with another half 64, as with halves 36 shown in FIG. 2, core 68 and outer portion 66 are held interlocked together by nuts 56 and bolts 54, and attachment plates 40.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A swing arm with impact dampener, comprising:
    a swing arm having a pivoting coupling end and a non-pivoting coupling end;
    an impact dampening assembly connecting the non-pivoting coupling end to an axle, the impact dampening assembly comprising:
    a tubular bushing housing positioned transversely across the non-pivoting coupling end of the swing arm, the housing defining a bushing receiving cavity with two open opposed ends;
    a bushing offset from the axle, the impact dampening assembly allowing torsional movement of the axle relative to the non-pivoting coupling end upon application of a force to the axle, the bushing being a compliant bushing disposed in the bushing receiving cavity and protruding past each of the opposed ends;
    attachment plates covering each the opposed ends of the housing, the attachment plates being adapted to facilitate attachment of the non-pivoting coupling end of the swing arm to the axle; and
    the attachment plates exerting a clamping force upon the bushing, such that the bushing deforms in response to force exerted via the attachment plates prior to transferring impact forces via the housing to the swing arm.

2. The swing arm as defined in claim 1, wherein fasteners extend through the bushing and the attachment plates to clamp the attachment plates together.

3. The swing arm as defined in claim 2, wherein wear sleeves extends through the compliant bushing, with the fasteners extending through the wear sleeves.

4. The swing arm as defined in claim 2, wherein the fasteners are bolts and the clamping force is exerted through the use of nuts.

5. The swing arm as defined in claim 1, wherein the swing arm is forked and has two spaced apart non-pivoting coupling ends.

6. The swing arm as defined in claim 1, wherein the housing is rectangular in cross-section and the bushing is rectangular in cross-section.

7. The swing arm as defined in claim 1, wherein the bushing has two halves, each of the bushing halves being inserted from one of the opposed ends.

8. The swing arm as defined in claim 7, wherein each of the bushing halves has a flange.

9. The swing arm as defined in claim 1, wherein a compression plate is disposed within bushing receiving cavity of the housing and means are provided to cause the compression plate to exert a compression force upon the bushing.

10. The swing arm as defined in claim 1, wherein a remote edge of each of the attachment plates is C-shaped with projecting arms defining a border for a cavity.

11. The swing arm as defined in claim 10, wherein each of the projecting arms has a slotted opening.

12. The swing arm as defined in claim 1, wherein the pivoting coupling end has a pair of spaced shaft retainers defining axially aligned circular openings.

13. The swing arm as defined in claim 1, wherein the compliant bushing is made of at least two materials, each of the at least two materials having differing compliant properties.

14. The swing arm as defined in claim 13, wherein the compliant bushing has a central core made from a first materiel and a outer portion made from a second material, the first materiel for the central core being stiffer and less compliant as compared to the second material for the outer portion.

15. The swing arm as defined in claim 14, wherein the central core interlocks with the outer portion.

16. A swing arm with impact dampener, comprising:
    a forked swing arm having a pivoting coupling end and two spaced apart non-pivoting coupling ends;
    an impact dampening assembly positioned at each of the non-pivoting coupling end, including:
    a tubular bushing housing, which is rectangular in cross-section, positioned transversely across the non-pivoting coupling end of the swing arm, the housing defining a bushing receiving cavity with two open opposed ends;
    a rectangular compliant bushing disposed in the bushing receiving cavity and protruding past each of the opposed ends, the bushing having apertures extending therethrough;
    wear sleeves extending through the apertures in the compliant bushing;
    attachment plates covering each the opposed ends of the housing, the attachment plates having openings, the attachment plates being adapted to facilitate attachment of the non-pivoting coupling end of the swing arm to an axle;
    bolts extending through the wear sleeves in the bushing and the openings in the attachment plates;
    nuts cooperating with the bolts to exert a clamping force of the attachment plates upon the bushing, such that the bushing deforms in response to force exerted via the attachment plates prior to transferring impact forces via the housing to the swing arm.

17. The swing arm as defined in claim 16, wherein the bushing has two halves, each of the bushing halves being inserted into the bushing receiving cavity from one of the opposed ends.

18. The swing arm as defined in claim 17, wherein each of the bushing halves has a flange.

19. The swing arm as defined in claim 16, wherein the compliant bushing is made of at least two materials, each of the at least two materials having differing compliant properties.

20. The swing arm as defined in claim 19, wherein the compliant bushing has a central core made from a first material and a outer portion made from a second material, the first material for the central core being stiffer and less compliant as compared to the second material for the outer portion.

21. The swing arm as defined in claim 20, wherein the central core interlocks with the outer portion.

22. The swing arm as defined in claim 16, wherein a compression plate is disposed within the housing and screws extending through threaded apertures in the housing are used to move the compression plate to cause the compression plate to exert a compression force upon the bushing.

23. The swing arm as defined in claim 16, wherein a remote edge of each of the attachment plates is C-shaped with projecting arms defining a border for a cavity.

24. The swing arm as defined in claim 23, wherein each of the projecting arms has a slotted opening.

25. The swing arm as defined in claim 16, wherein the pivoting coupling end has a pair of spaced shaft retainers defining axially aligned circular openings.

26. A swing arm with impact dampener, comprising:
   a forked swing arm having a pivoting coupling end and two spaced apart non-pivoting coupling ends, the pivoting coupling end having a pair of spaced shaft retainers defining axially aligned circular openings;
   an impact dampening assembly positioned at each of the non-pivoting coupling end, including:
   a tubular bushing housing, which is rectangular in cross-section, positioned transversely across the non-pivoting coupling end of the swing arm, the housing defining a bushing receiving cavity with two open opposed ends;
   a rectangular compliant bushing disposed in the bushing receiving cavity and protruding past each of the opposed ends, the bushing having apertures extending therethrough, the bushing consisting of two halves, each of the bushing halves being inserted into the bushing receiving cavity of the housing from one of the opposed ends, each of the bushing halves having a flange which limits depth of insertion into the bushing receiving cavity;
   metal wear sleeves extending through the apertures in the compliant bushing;
   attachment plates covering each the opposed ends of the housing, the attachment plates having openings, the attachment plates being adapted to facilitate attachment of the non-pivoting coupling end of the swing arm to an axle, a remote edge of each of the attachment plates being C-shaped with projecting arms defining a border for a cavity, each of the projecting arms having a slotted opening;
   bolts extending through the wear sleeves in the bushing and the openings in the attachment plates;
   nuts cooperating with the bolts to exert a damping force of the attachment plates upon the bushing, such that the bushing deforms in response to force exerted via the attachment plates prior to transferring impact forces via the housing to the swing arm;
   a compression plate disposed within the housing; and
   screws extending through threaded apertures in the housing to move the compression plate and cause the compression plate to exert a compression force upon the bushing.

27. The swing arm as defined in claim 26, in combination with an axle having a cylindrical exterior surface with a pair of spaced apart swing arm mountings on the exterior surface, each of the swing arm mountings having an upper fastener receiver and a lower fastener receiver, the axle being secured to the attachment plates by fasteners which extend through the slotted openings in the projecting arms of the attachment plates and the upper fastener receiver and through the slotted openings in the projecting arms of the attachment plates and the lower fastener receiver.

28. The swing arm as defined in claim 27, wherein the attachment plates have inwardly projecting ears with threaded apertures in which are received alignment screws, the alignment screws being used to exert a force to assist in alignment of the swing arm relative to the axle by moving the fasteners extending through the upper fastener receiver and the lower fastener receiver along the slotted openings in the projecting arms of the attachment plates.

\* \* \* \* \*